(12) United States Patent
Wu et al.

(10) Patent No.: US 9,417,423 B2
(45) Date of Patent: Aug. 16, 2016

(54) MICRO PROJECTOR AND FIXING STRUCTURE THEREOF

(71) Applicant: MEGAFORCE COMPANY LIMITED, New Taipei (TW)

(72) Inventors: Wen-Chieh Wu, New Taipei (TW); Pao-Tang Su, New Taipei (TW)

(73) Assignee: MEGAFORCE COMPANY LIMITED, New Taipei (TW)

( * ) Notice: Subject to any disclaimer, the term of this patent is extended or adjusted under 35 U.S.C. 154(b) by 26 days.

(21) Appl. No.: 14/226,000

(22) Filed: Mar. 26, 2014

(65) Prior Publication Data

US 2015/0153536 A1 Jun. 4, 2015

(30) Foreign Application Priority Data

Mar. 27, 2013 (TW) .............................. 102205652 U (51) Int. Cl.
*G02B 7/02* (2006.01)
*G02B 21/36* (2006.01)
*G03B 21/10* (2006.01)
*G02B 19/00* (2006.01)

(52) U.S. Cl.
CPC ............ *G02B 7/025* (2013.01); *G02B 19/0052* (2013.01); *G03B 21/10* (2013.01)

(58) Field of Classification Search
CPC ................... G02B 27/0172; G02B 2027/0138; G02B 27/0149; H04N 7/142; H04N 9/3173; G02C 9/00; G03B 21/10; G03B 21/14
See application file for complete search history.

*Primary Examiner* — Alicia M Harrington
(74) *Attorney, Agent, or Firm* — Muncy, Geissler, Olds & Lowe, P.C.

(57) ABSTRACT

The fixing structure of the micro projector includes a base, a plurality of abutting members and a plurality of fixing components. The base has an assembling plane. The abutting members are respectively disposed on the assembling plane. Each abutting member has an abutting wall, and each optical lens is abutted against each corresponding abutting wall. The fixing components are respectively disposed on the assembling plane and correspond to the abutting walls respectively, and each fixing component fixes each corresponding optical lens on each corresponding abutting wall. Based on this, there is no need to apply adhesives for fixing the optical lens. Additionally, upon assembling the optical lens, since no adhesives are applied it is not necessary to adjust the angle of the optical lens thereby improving the convenience of assembly and reducing the assembly time.

22 Claims, 11 Drawing Sheets

MICRO PROJECTOR AND FIXING STRUCTURE THEREOF

CROSS-REFERENCES TO RELATED APPLICATIONS

This non-provisional application claims priority under 35 U.S.C. §119(a) on Patent Application No. 102205652 filed in Taiwan, R.O.C. on Mar. 27, 2013 the entire contents of which are hereby incorporated by reference.

BACKGROUND

1. Technical Field

The disclosure relates to a micro projecting device, and particularly relates to a micro projector and fixing structure thereof.

2. Related Art

A conventional projecting device is mainly composed of a light source module, an illuminating module and an imaging module. A light beam is emitted from the light source module firstly, and passing through the integration rod, collecting mirror and other components of the illuminating module, then passing through the light engine of the imaging module so as to form an image beam, thereby the image beam being projected on the screen by a projecting lens so as to form an image picture.

Figure 1:
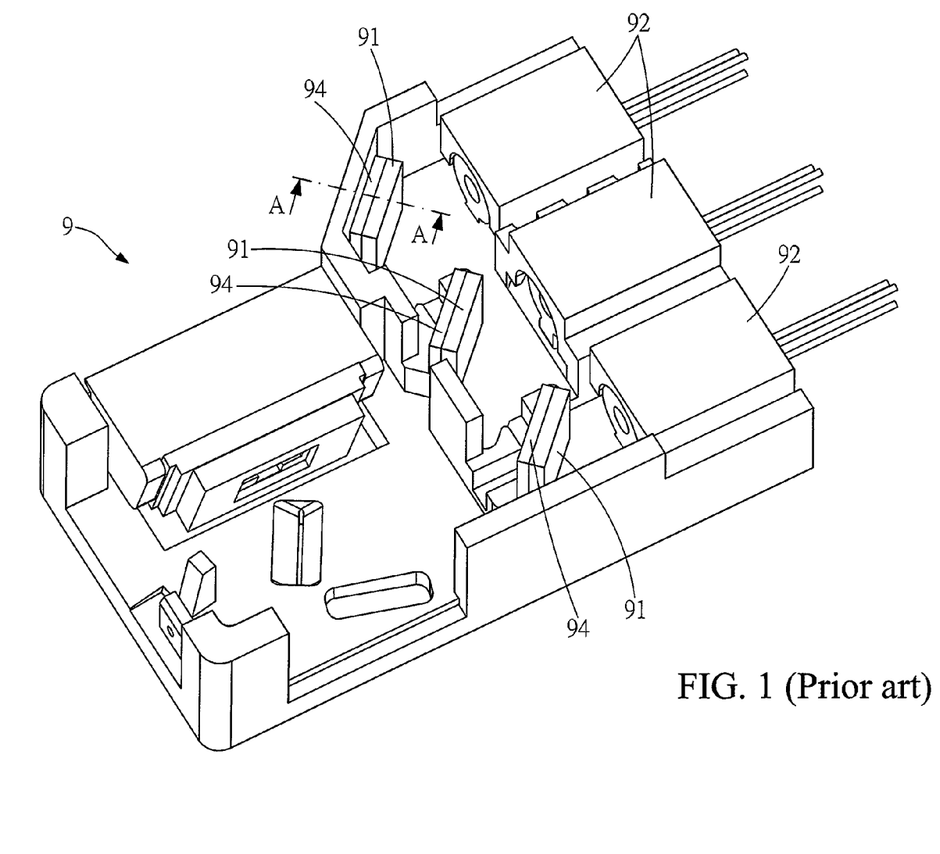
FIG. 1 is a prior art of perspective view of a conventional micro projector.
Figure 2:
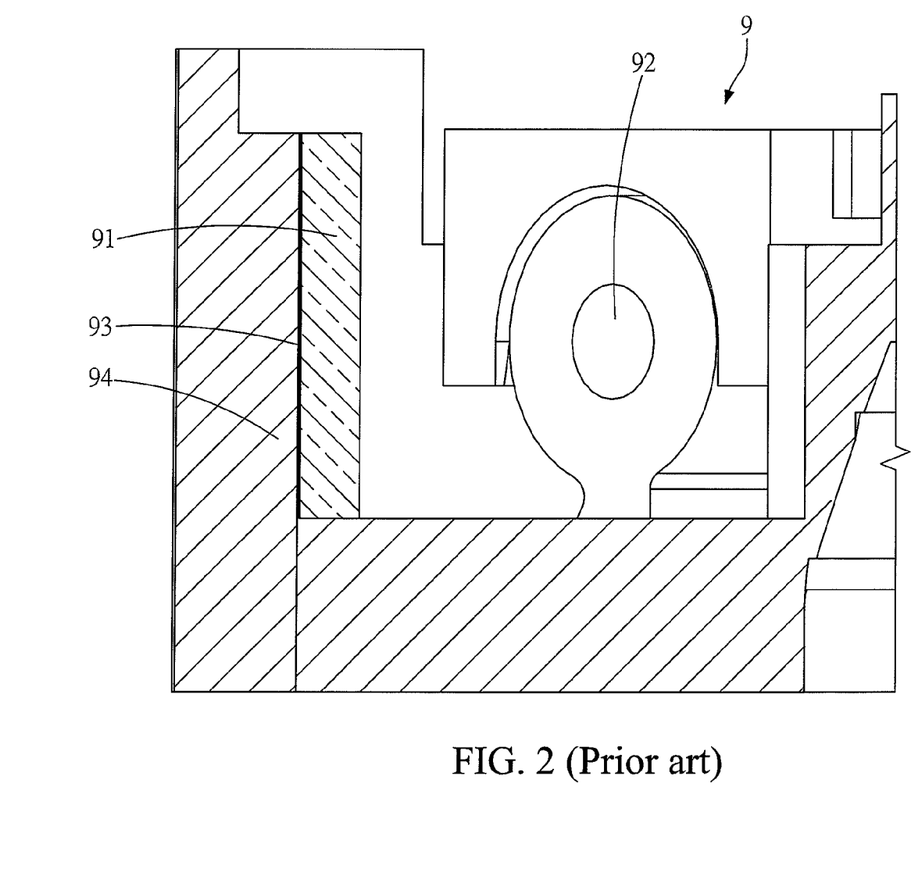
FIG. 2 is a prior art of cross-sectional view along line A-A shown in FIG. 1.

The size and the weight of a personal electronic device have reduced gradually, along with the development of related technologies. Consequently, micro-sized projectors have become a trend within projector markets. Please refer to FIG. 1 and FIG. 2, which are a perspective view of a conventional micro projector and a cross-sectional view along line A-A shown in FIG. 1. The micro projector 9 has three optical lenses 91 disposed therein and the three optical lenses 91 correspond to three color light sources 92. Each optical lens 91 is fixed on each corresponding fixing wall 94 through an adhesive layer 91 (as shown in FIG. 2), so that the optical lenses 91 reflect light beams steadily.

During the assembly of the optical lenses 91, the adhesive layer 93 is firstly disposed on the fixing wall 94, and then the optical lens 91 is adhered securely on the adhesive layer 93. However, since the adhesive layer 93 cannot be dried in time upon assembling the optical lens 91, the application of the adhesive layer 93 will require the angle of the optical lens 91 to be adjusted frequently during the assembling of the optical lens 91, thereby resulting in an inconvenience for assembly and increasing the assembly time required for assembling the optical lens 91.

SUMMARY

In view of this, the disclosure provides a micro projector and a fixing structure thereof so as to fix the optical lenses and to reduce the usage amount of the adhesive, thereby improving the convenience upon assembling and reducing the assembly time.

The fixing structure of the micro projector includes a base, a plurality of abutting members and a plurality of fixing components. The base has an assembling plane. The abutting members are respectively disposed on the assembling plane. Each abutting member has an abutting wall, and each optical lens is abutted against each corresponding abutting wall. The fixing components are respectively disposed on the assembling plane and correspond to the abutting walls respectively, and each fixing component fixes each corresponding optical lens on each corresponding abutting wall.

As described, since the optical lens is fixed on the abutting wall through the fixing component, there is no need to apply adhesives for fixing the optical lens. Furthermore, upon assembling the optical lens, since no adhesives are applied, it is not necessary to adjust the angle of the optical lens thereby improving the convenience of assembly and reducing assembly time. Additionally, since the height of the abutting wall of the abutting member is lower than the height of the optical lens, the amount of the material for forming the abutting member can be reduced; even if adhesives are applied, the amount of the adhesive used can also be reduced.

The detailed features and advantages of the disclosure are described below in great detail through the following embodiments, the content of the detailed description is sufficient for those skilled in the art to understand the technical content of the disclosure and to implement the disclosure there accordingly. Based on the content of the specification, the claims, and the drawings, those skilled in the art can easily understand the relevant objectives and advantages of the disclosure.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 3:
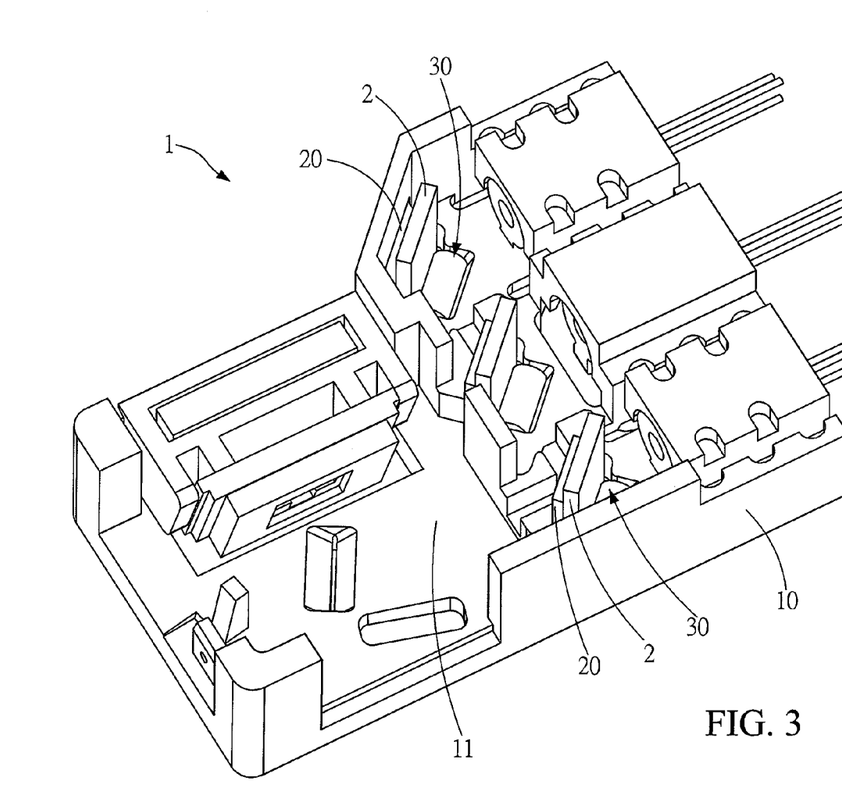
FIG. 3 is a perspective view of a micro projector of a first embodiment of the disclosure.
Figure 4:
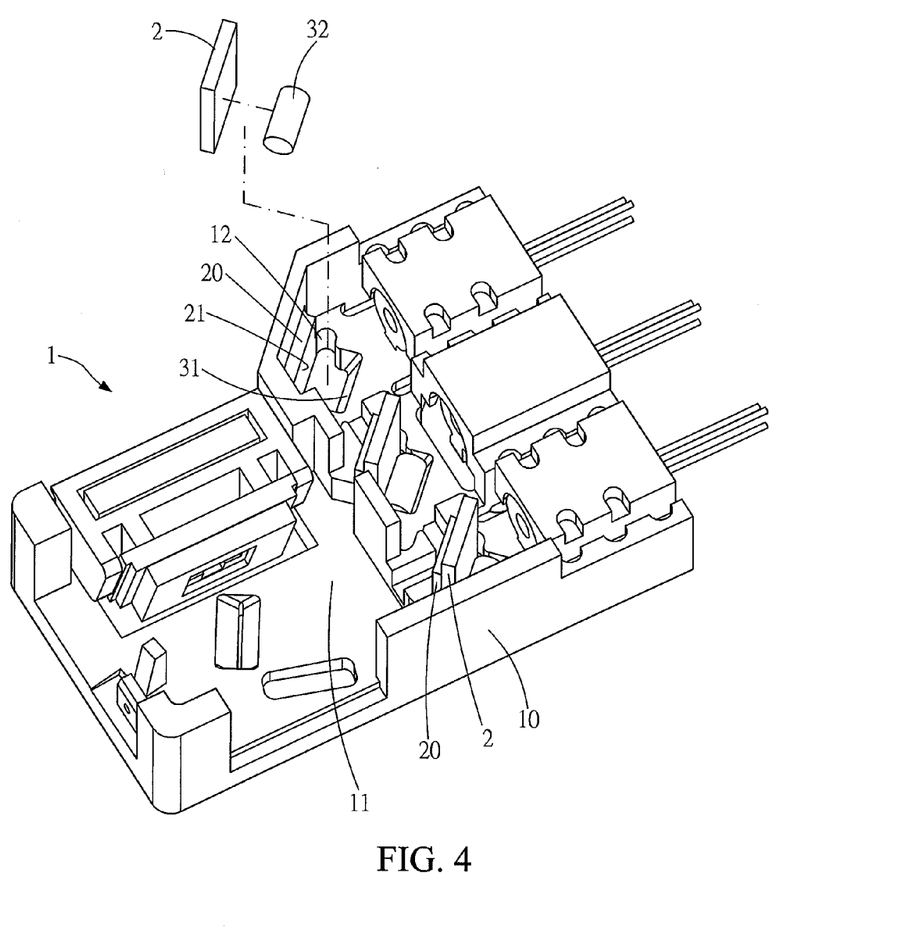
FIG. 4 is an exploded view of the micro projector of the first embodiment of the disclosure.
Figure 5:
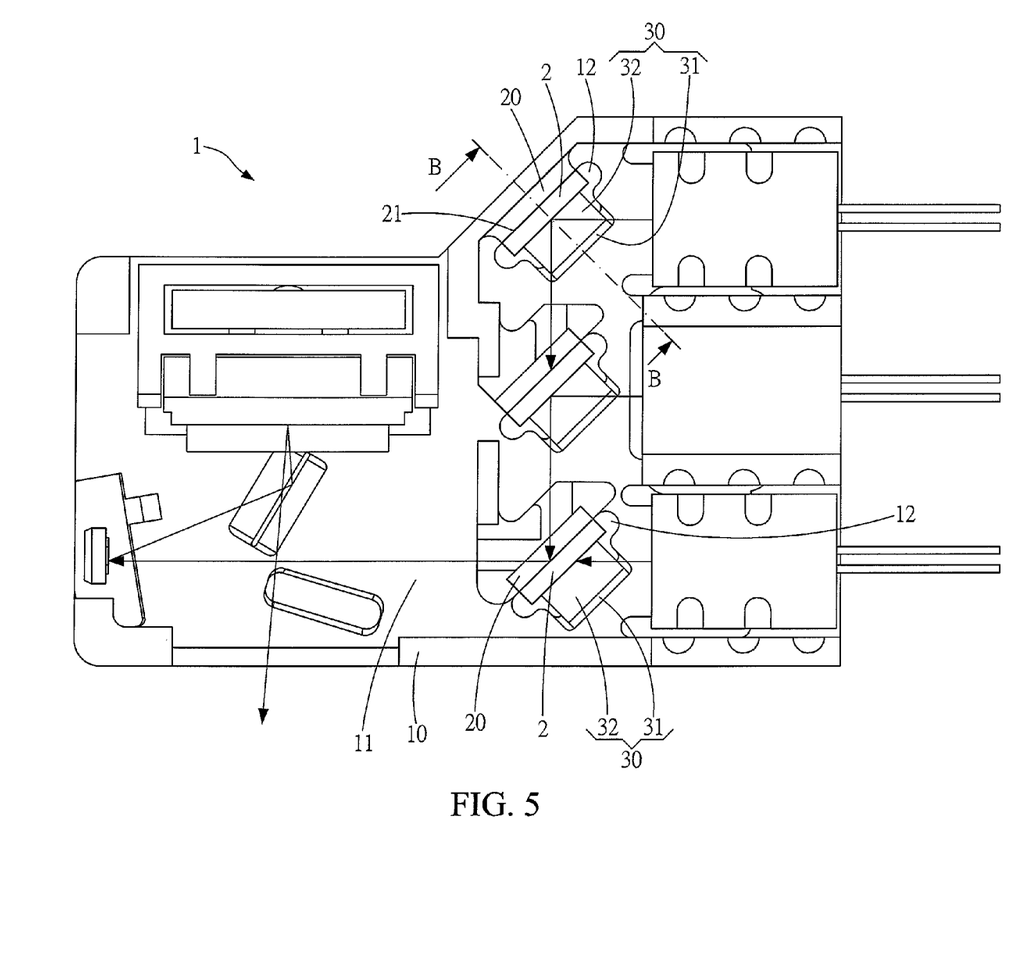
FIG. 5 is a top view of the micro projector of the first embodiment of the disclosure.
Figure 6:
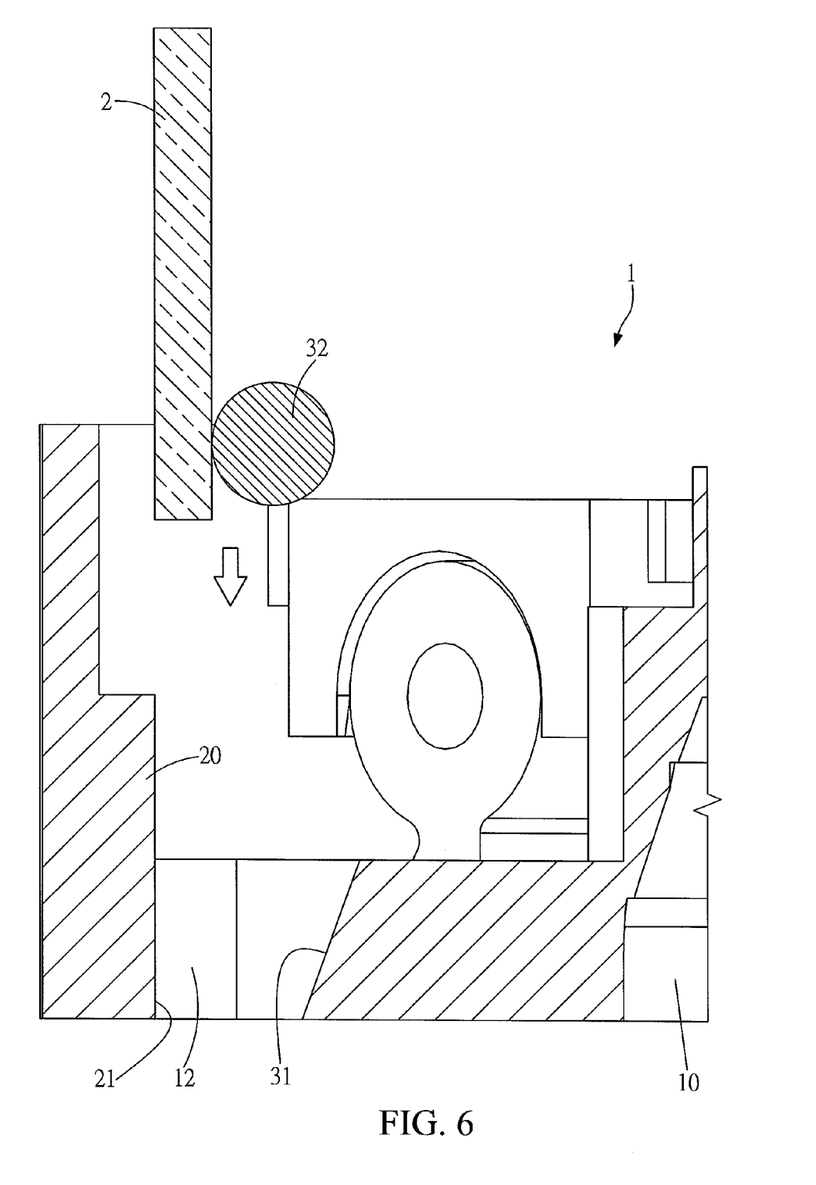
FIG. 6 is a schematic sectional view for showing the assembling of the micro projector of the first embodiment of the disclosure.
Figure 7:
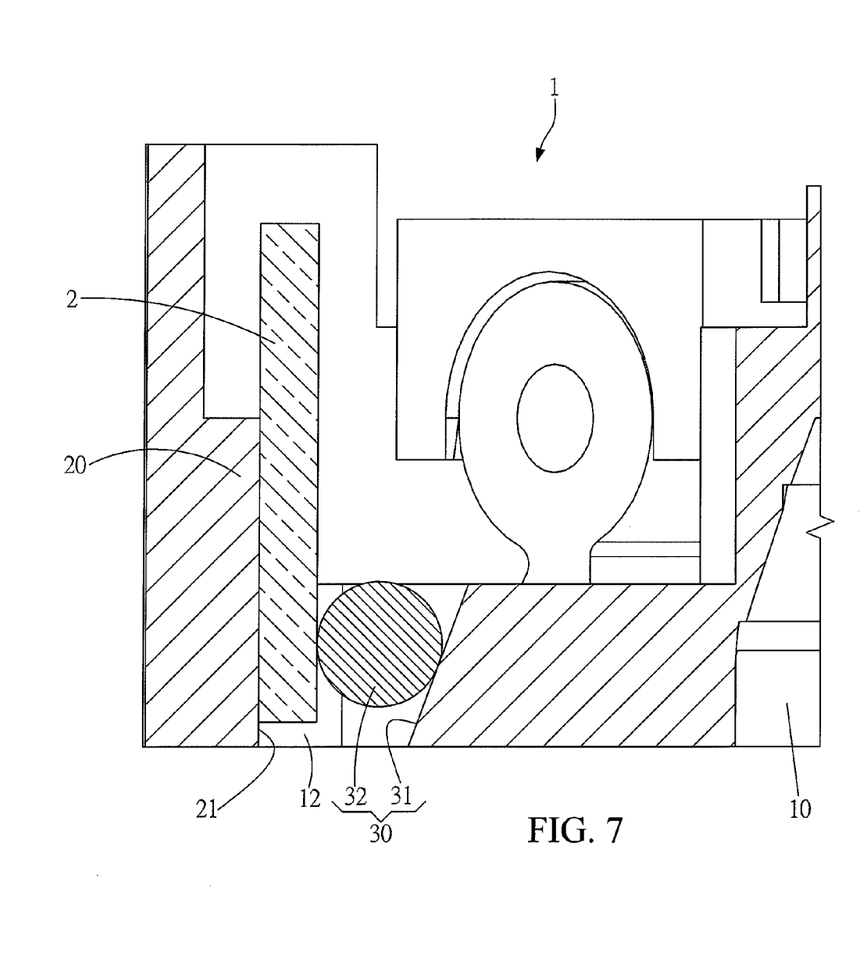
FIG. 7 is a cross-sectional view along line B-B shown in FIG. 5.

FIG. 3 is a perspective view of a micro projector of a first embodiment of the disclosure, FIG. 4 is an exploded view of the micro projector of the first embodiment of the disclosure, FIG. 5 is a top view of the micro projector of the first embodiment of the disclosure, FIG. 6 is a schematic sectional view for showing the assembling of the micro projector of the first embodiment of the disclosure, and FIG. 7 is a cross-sectional view along line B-B shown in FIG. 5.

Please refer to FIGS. 3-7, which illustrate the micro projector 1 of the first embodiment of the disclosure. The micro projector 1 has a fixing structure applicable for fixing a plurality of optical lenses 2. The fixing structure includes a base 10, a plurality of abutting members 20 and a plurality of fixing components 30. The base 10 has an assembling plane 11, and each optical lens 2 is disposed on the assembling plane 11. Each abutting member 20 is formed integrally on the assembling plane 11 and has an abutting wall 21, so that each optical lens 2 is fixed on each corresponding abutting wall 21. Each fixing component 30 is disposed on the assembling plane 11 respectively and corresponds to each corresponding abutting wall 21. Each fixing component 30 is provided for fixing each corresponding optical lens 2 on each corresponding abutting wall 21.

The base 10 further includes a plurality of fixing holes 12. Each fixing hole 12 is formed between each corresponding abutting wall 21 and each corresponding fixing component 30. Each fixing hole 12 is opened through the base 10 (as shown in FIG. 6); that is, the assembling plane 11 communicates with the plane opposite to the assembling plane 11 through each fixing hole 12, but embodiments are not limited thereto. In some implementation aspects, each fixing hole 12 is not opened through the base 10 (not shown). The bottom of each optical lens 2 is inserted into each corresponding fixing hole 12.

In this embodiment, the height of the abutting wall 21 of each abutting member 20 is lower than the height of each corresponding optical lens 2; preferably, the height of the abutting wall 21 of each abutting member 20 is lower than three fourths of the height of each corresponding optical lens 2. Here, as shown in FIG. 7, the height of the abutting wall 21 of each abutting member 30 is higher than one half of the height of each corresponding optical lens 2; namely, the top of each abutting wall 21 is approximately higher than the middle of each corresponding optical lens 2. The reduction of the height of the abutting member 20 (or the reduction of the length of the abutting member 20), reduces the amount of the material for forming the abutting member 20; additionally, when an adhesive 33 is applied on the abutting member 20, the applied amount of the adhesive 33 can be reduced as well. Additionally, the height of the abutting member 20 is not limited thereto.

Figure 8:
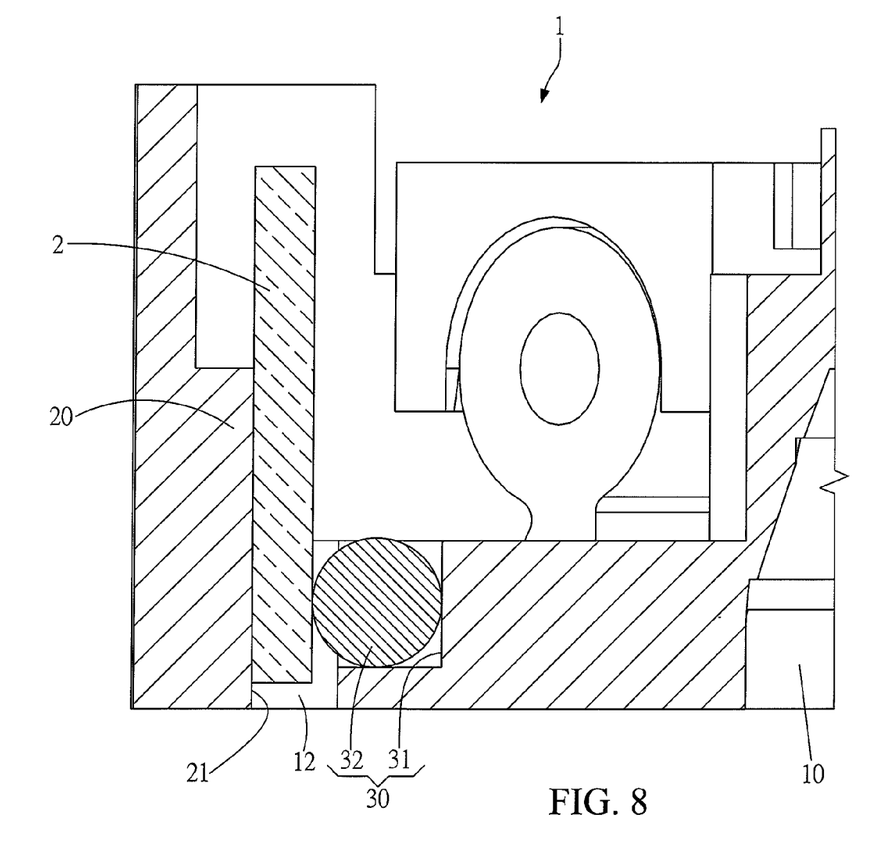
FIG. 8 is another cross-sectional view of the micro projector of the first embodiment of the disclosure.

Each fixing component 30 further includes a fixing plane 31 and a fixing rod 32. Each fixing rod 32 is fixed on each corresponding fixing plane 31, and one side of each fixing rod 32 is abutted against each corresponding optical lens 2 and is opposite to each corresponding fixing plane 31 (as shown in FIG. 7). Furthermore, each fixing rod 32 is abutted against each corresponding optical lens 2 at a position lower than one half of the height of each corresponding optical lens 2. In this embodiment, each fixing rod 32 is abutted against at a portion substantially equal to one fourth of the height of each corresponding optical lens 2, but embodiments are not limited thereto. And, in this embodiment, each fixing plane 31 is tilted downwardly from a direction distant from each corresponding abutting wall 21 to a direction near to each corresponding abutting wall 21; that is, the height of the fixing plane 31 increases gradually from a close side thereof toward a distant side thereof in which the close side is near to the abutting wall 21 and the distant side is far from the abutting wall 21 (as shown in FIG. 7), but embodiments are not limited thereto; in some embodiments, each fixing plane 31 is parallel to each corresponding abutting wall 21 (as shown in FIG. 8).

Figure 9:
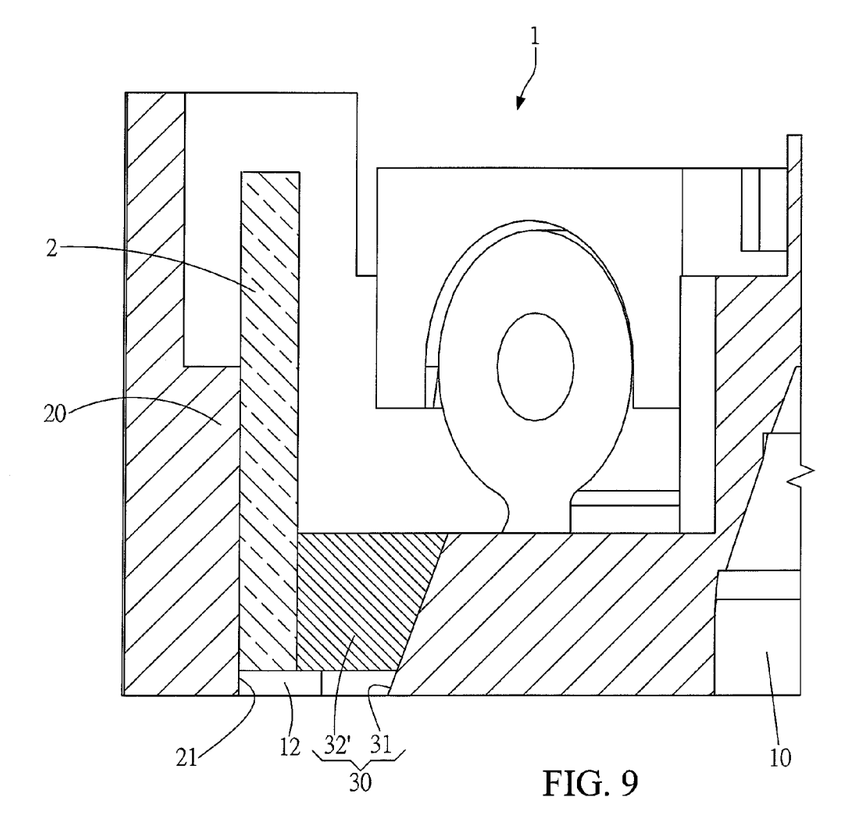
FIG. 9 is a further cross-sectional view of the micro projector of the first embodiment of the disclosure.

Since each fixing rod 32 is abutted against each corresponding optical lens 2 in a line-contacting manner (as shown in FIG. 7), the fixing rod 32 can be a round cylinder or other polygonal cylinders capable of being linearly contacted with the optical lens 2, but embodiments are not limited thereto. In some embodiments, each fixing rod 32' is abutted against each corresponding optical lens 2 in a face-contacting manner (as shown in FIG. 9); namely, the fixing rod 32' can be a polygonal cylinder but not a round cylinder. The fixing rod 32' shown in FIG. 9 is a cylinder which has a trapezoid outline upon viewing laterally.

Upon assembling, a foundation plate (not shown), with a plurality of protruding blocks is provided, so that each fixing hole 12 aligns with each corresponding protruding blocks. Based on this, when the optical lens 2 is disposed in the fixing holes 12, the bottom of the optical lens 2 is disposed on the protruding block, and the optical lens 2 is fixed on the fixing plane 31 through the fixing rod 32 of the fixing component 30; moreover, one side of the fixing rod 32, which is opposite to the fixing plane 30 is abutted against the optical lens 2, so that the optical lens 2 is securely abutted against the abutting wall 21. Finally, the foundation plate can be removed, and the assembling and the fixing of the optical lenses 2 of the micro projector 1 are finished. Therefore, there is no need to apply adhesives between the optical lens 2 and the abutting wall 21 thereby reducing the amount of adhesive used; additionally, since the optical lens 2 is fixed steadily on the abutting wall 21 through the fixing component 30, the height of the abutting wall 21 of the micro projector 1 of the disclosure is lower than that of the conventional micro projector without reducing the stability of the optical lens 2. Additionally, the fixing structure increases the convenience of assembly, thus reducing assembling time.

Figure 10:
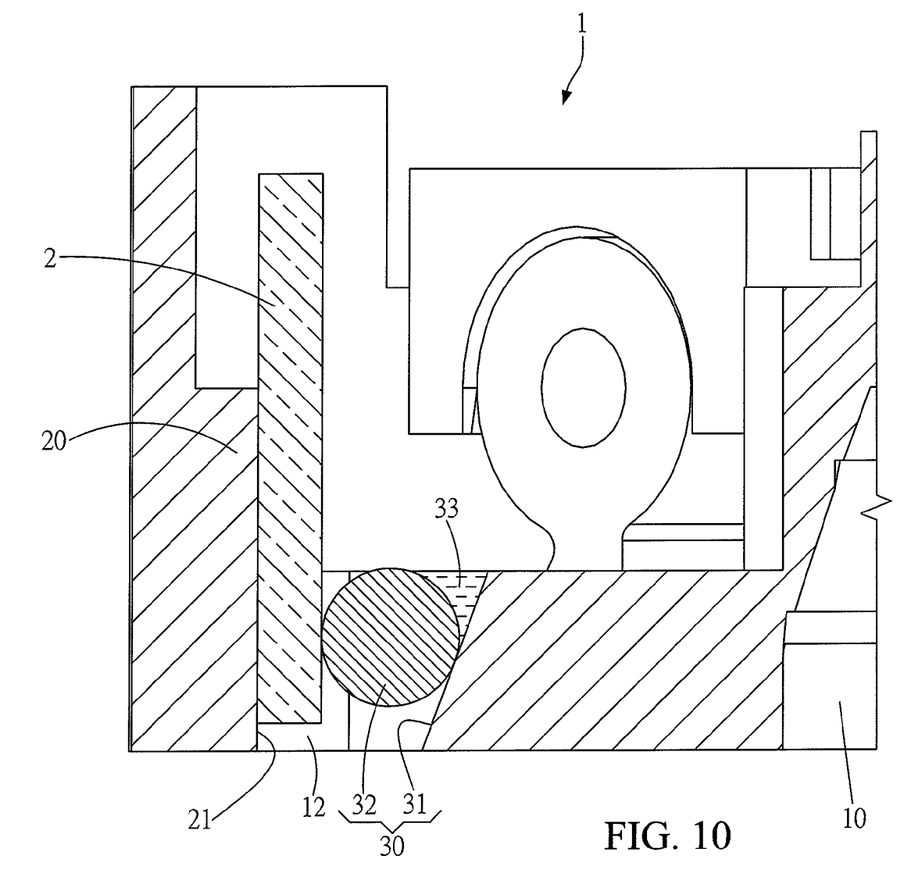
FIG. 10 is a cross-sectional view of a micro projector of a second embodiment of the disclosure.

FIG. 10 shows a second embodiment of the disclosure, which is approximately similar to the first embodiment, except that in the second embodiment, an adhesive 3 is further applied between the fixing plane 31 and the fixing rod 32, so that the fixing rod 32 is securely fixed on the fixing plane 31.

Figure 11:
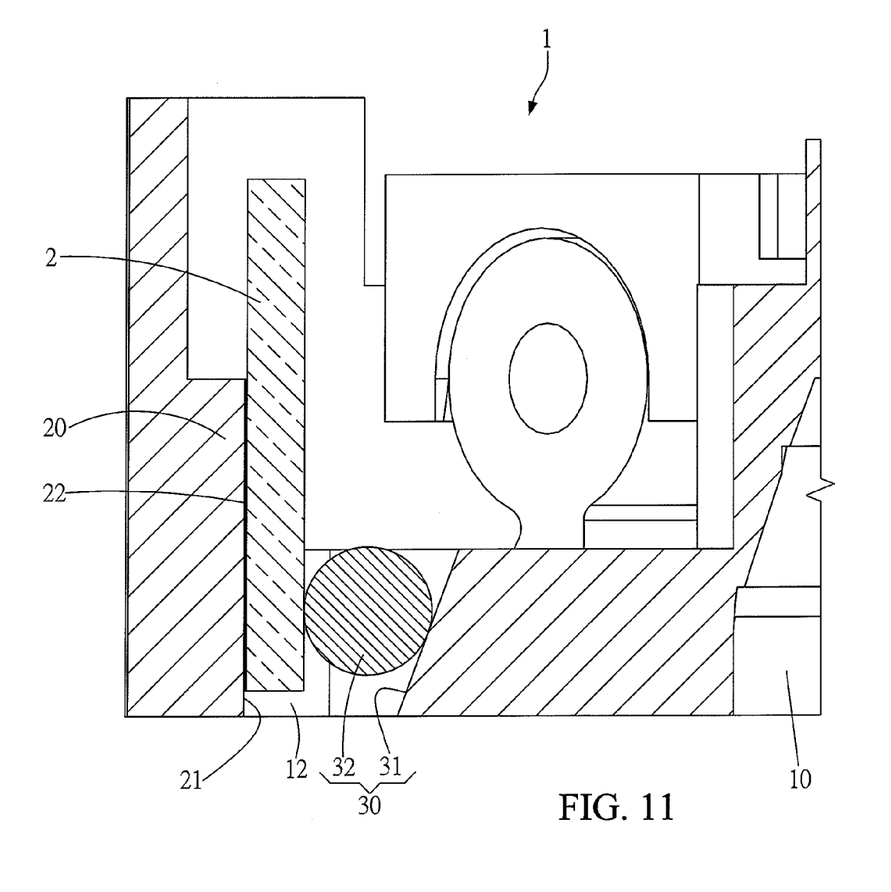
FIG. 11 is a cross-sectional view of a micro projector of a third embodiment of the disclosure.

FIG. 11 shows a third embodiment of the disclosure, which is approximately similar to the previously mentioned embodiments, except that in the third embodiment, further including an adhesive layer 22 disposed between the abutting wall 21 and the optical lens 2. Since the optical lens 2 is securely fixed on the abutting wall 21 through the fixing component 30, even if the height of the abutting wall 21 is lower than that of the optical lens 2, the optical lens 2 can still be fixed on the abutting wall 21 steadily, thus the usage amount of the adhesive layer 22 is reduced as compared to the conventional design.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A fixing structure of a micro projector, provided for fixing a plurality of optical lenses in the micro projector, comprising:
    a base, having an assembling plane;
    a plurality of abutting members, respectively disposed on the assembling plane, each abutting member respectively having an abutting wall, each optical lens abutted against each corresponding abutting wall; and
    a plurality of fixing components, respectively disposed on the assembling plane and respectively corresponding to the abutting walls, each fixing component fixing each corresponding optical lens on each corresponding abutting wall;
    wherein each fixing component further comprises a fixing plane and a fixing rod, each fixing plane fixes each corresponding fixing rod, each fixing rod is abutted against each corresponding optical lens.

2. The fixing structure of a micro projector according to claim 1, wherein the base has a plurality of fixing holes, each fixing hole is formed between each corresponding abutting wall and each corresponding fixing component, and each optical lens is passing through each corresponding fixing hole.

3. The fixing structure of a micro projector according to claim 1, wherein each fixing plane is tilt from a direction distant from each corresponding abutting wall to a direction near to each corresponding abutting wall.

4. The fixing structure of a micro projector according to claim 1, wherein each fixing plane is parallel to each corresponding abutting wall.

5. The fixing structure of a micro projector according to claim 1, wherein each fixing component comprises an adhesive, each fixing rod is fixed on each corresponding fixing plane through each corresponding adhesive.

6. The fixing structure of a micro projector according to claim 1, wherein each fixing rod is abutted against each corresponding optical lens in a line-contacting manner.

7. The fixing structure of a micro projector according to claim 1, wherein each fixing rod is abutted against each corresponding optical lens in a face-contacting manner.

8. The fixing structure of a micro projector according to claim 1, wherein each abutting member is respectively formed integrally on the assembling plane.

9. A micro projector, comprising:
a plurality of optical lenses;
a base, having an assembling plane, each optical lens assembling on the assembling plane;
a plurality of abutting members, respectively disposed on the assembling plane, each abutting member respectively having an abutting wall, each optical lens abutted against each corresponding abutting wall; and
a plurality of fixing components, respectively disposed on the assembling plane and respectively corresponding to the abutting walls, each fixing component fixing each corresponding optical lens on each corresponding abutting wall;
wherein each fixing component further comprises a fixing place and a fixing rod, each fixing place fixes each corresponding fixing rod, each fixing rod is abutted against each corresponding optical lens.

10. The micro projector according to claim 9, wherein the base has a plurality of fixing holes, each fixing hole is formed between each corresponding abutting wall and each corresponding fixing component, and each optical lens is passing through each corresponding fixing hole.

11. The micro projector according to claim 9, wherein each fixing plane is tilt from a direction near to each corresponding abutting wall to a direction distant from each corresponding abutting wall.

12. The micro projector according to claim 9, wherein each fixing plane is parallel to each corresponding abutting wall.

13. The micro projector according to claim 9, wherein each fixing component comprises an adhesive, each fixing rod is fixed on each corresponding fixing plane through each corresponding adhesive.

14. The micro projector according to claim 9, wherein each fixing rod is abutted against each corresponding optical lens in a line-contacting manner.

15. The micro projector according to claim 9, wherein each fixing rod is abutted against each corresponding optical lens in a face-contacting manner.

16. The micro projector according to claim 9, wherein each fixing rod is abutted against each corresponding optical lens at a portion lower than or equal to one half of the height of each corresponding optical lens.

17. The micro projector according to claim 16, wherein each fixing rod is abutted against each corresponding optical lens at a portion substantially equal to one fourth of the height of each corresponding optical lens.

18. The micro projector according to claim 9, wherein the height of each abutting wall is larger than one half of the height of each corresponding optical lens.

19. The micro projector according to claim 18, wherein the height of each abutting wall is substantially equal to three fourth of each corresponding optical lens.

20. The micro projector according to claim 9, further comprising an adhesive layer disposed between each abutting wall and each corresponding optical lens.

21. The micro projector according to claim 9, wherein each abutting member is respectively formed integrally on the assembling plane.

22. A fixing structure of a micro projector, provided for fixing a plurality of optical lenses in the micro projector, comprising:
a base, having an assembling plane;
a plurality of abutting members, respectively disposed on the assembling plane, each abutting member respectively having an abutting wall, each optical lens abutted against each corresponding abutting wall; and
a plurality of fixing components, respectively disposed on the assembling plane and respectively corresponding to the abutting walls, each fixing component fixing each corresponding optical lens on each corresponding abutting wall;
wherein the base has a plurality of fixing holes, each fixing hole is formed between each corresponding abutting wall and each corresponding fixing component, and each optical lens is passing through each corresponding fixing hole.

* * * * *